US011997242B2

(12) United States Patent
Yamada

(10) Patent No.: US 11,997,242 B2
(45) Date of Patent: May 28, 2024

(54) IMAGE FORMING APPARATUS CONFIGURED TO COMMUNICATE WITH NETWORK AND CAPABLE OF MANAGING NUMBER OF PRINT PAGES

(71) Applicant: BROTHER KOGYO KABUSHIKI KAISHA, Nagoya (JP)

(72) Inventor: Takatsugu Yamada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/324,361

(22) Filed: May 26, 2023

(65) Prior Publication Data

US 2023/0300275 A1 Sep. 21, 2023

Related U.S. Application Data

(63) Continuation of application No. 17/935,640, filed on Sep. 27, 2022, now Pat. No. 11,706,370, which is a (Continued)

(30) Foreign Application Priority Data

Mar. 31, 2020 (JP) ................................ 2020-063649

(51) Int. Cl.
*G06F 15/00* (2006.01)
*G06F 3/12* (2006.01)
*H04N 1/34* (2006.01)

(52) U.S. Cl.
CPC ........... *H04N 1/346* (2013.01); *G06F 3/1219* (2013.01); *G06F 3/1239* (2013.01); *H04N 1/344* (2013.01)

(58) Field of Classification Search
None
See application file for complete search history.

(56) References Cited

U.S. PATENT DOCUMENTS

2007/0003308 A1 1/2007 Kim
2009/0086255 A1 4/2009 Duong
(Continued)

FOREIGN PATENT DOCUMENTS

CN 1892576 A 1/2007
CN 101714070 A 5/2010
(Continued)

OTHER PUBLICATIONS

International Search Report and Written Opinion issued in corresponding International Patent Application No. PCT/JP2021/013015, dated May 18, 2021.

(Continued)

*Primary Examiner* — Mark R Milia
(74) *Attorney, Agent, or Firm* — Merchant & Gould P.C.

(57) ABSTRACT

An image forming apparatus includes a main body memory, and a controller. A second upper limit information stored in the main body memory indicates an upper limit of a printable page number that the image forming apparatus is allowed to print in a state where the image forming apparatus is in an off-line state. A printed page number information stored in the main body memory indicates a printed page number printed in the off-line state. The controller is configured to: increment the printed page number information by one in a case where the one sheet of paper is printed on one side printing; and increment the printed page number information by two in a case where the one sheet is printed on double-sided printing. The controller is configured to determine whether the printed page number information is greater than or equal to the second upper limit page number.

7 Claims, 7 Drawing Sheets

Related U.S. Application Data continuation of application No. 17/213,669, filed on Mar. 26, 2021, now Pat. No. 11,483,448.

(56) References Cited

U.S. PATENT DOCUMENTS

| | | | |
|---|---|---|---|
| 2010/0078883 | A1 | 4/2010 | Uchida |
| 2012/0026515 | A1 | 2/2012 | Muramoto |
| 2014/0355029 | A1 | 12/2014 | Mccoog |
| 2016/0011554 | A1 | 1/2016 | Shipman et al. |
| 2017/0063646 | A1 | 3/2017 | Kawai |
| 2018/0131831 | A1 | 5/2018 | Tolia et al. |
| 2019/0132285 | A1 | 5/2019 | Yokoyama |

FOREIGN PATENT DOCUMENTS

| | | | |
|---|---|---|---|
| CN | 102348032 | A | 2/2012 |
| CN | 104969172 | A | 10/2015 |
| CN | 107921799 | A | 4/2018 |
| CN | 109725857 | A | 5/2019 |
| JP | 2008-164891 | A | 7/2008 |
| JP | 2012-022549 | A | 2/2012 |
| JP | 2017-47590 | A | 3/2017 |
| JP | 2017-49767 | A | 3/2017 |
| JP | 2018-56761 | A | 4/2018 |
| JP | 2018-532611 | A | 11/2018 |
| WO | 2014/120199 | A1 | 8/2014 |

OTHER PUBLICATIONS

Machine translation of Japanese Patent Document No. 2018-056761, Shimazu et al., Apr. 5, 2018 (Year: 2018).

Machine translation of Japanese Patent Document No. 2017-047590, Kawai, Mar. 9, 2017 (Year: 2017).

Office Action issued in corresponding Japanese Patent Application 2020-063649, dated Sep. 22, 2023.

Office Action issued in corresponding Chinese Patent Application No. 202180019363.8, Feb. 21, 2024.

IMAGE FORMING APPARATUS CONFIGURED TO COMMUNICATE WITH NETWORK AND CAPABLE OF MANAGING NUMBER OF PRINT PAGES

CROSS REFERENCE TO RELATED APPLICATION

This application is a continuation of U.S. patent application Ser. No. 17/935,640, filed Sep. 27, 2022, which is a continuation of U.S. patent application Ser. No. 17/213,669, filed Mar. 26, 2021, now U.S. Pat. No. 11,483,448, which claims priority to Japanese Patent Application No. 2020-063649 filed Mar. 31, 2020. The entire content of the priority applications is incorporated herein by reference.

TECHNICAL FIELD

The present disclosure relates to an image forming apparatus and a control method therefor.

BACKGROUND

Services are available for a user of an image forming apparatus such that a contract-dedicated consumable item or replaceable part can be used if there is a contract between the user and a service provider. Such service is called a "subscription service".

There has been known a printer (image forming apparatus) to which the subscription service is applicable. Such image forming apparatus receives a credit file from a subscription server. The credit file includes information indicating the number of printable sheets specified in the contract.

In the case where a subscription service applied cartridge is attached to the image forming apparatus, the image forming apparatus checks whether there remains a sufficient amount of credit (that is, the number of printable sheets) to print the number of pages indicated by the print job received at the image forming apparatus. When the image forming apparatus determines that there remains a sufficient amount of credit, the print job received at the image forming apparatus is carried out.

SUMMARY

However, with the conventional image forming apparatus described above, in an off-line state where the image forming apparatus is not connected to the internet, the credit cannot be supplemented to the image forming apparatus from a subscription server. Further, in the conventional image forming apparatus, whether there remains the sufficient amount of credit to achieve the print process is determined on a print-job basis. As such, when the number of printed pages has reached the upper limit number of print pages in the midst of printing, determination is made such that the remaining amount of credit is insufficient to complete the print job, with the result that the printing can no longer be executed. For example, in the case where a print job is received instructing to print 100 pages, printing of 100 pages in its entirety cannot be carried out although there remains 99 pages worth of credit.

As described, there may occur in the off-line state that the image forming apparatus cannot carry out printing a received job even though there still remains credit capable of printing some pages whose number is smaller than that of the pages required to print by the print job. This involves inconvenience for the users, because if the credit is usable on a print page basis, printing can be carried out for a possible number of pages inasmuch as the credit remains.

In view of the foregoing, it is an object of the disclosure to manage the number of print pages when the image forming apparatus is in the off-line stat without losing the user's convenience as much as it can be.

In order to attain the above and other objects, according to one aspect, the disclosure provides an image forming apparatus including an interface, a main body memory, and a controller. The interface is configured to communicate with a network. The main body memory is configured to store therein a first upper limit information, a second upper limit information and a printed page number information. The first upper limit information indicates an upper limit of a printable page number that is defined in accordance with contents of a contract set in the image forming apparatus. The second upper limit information indicates an upper limit of a printable page number that the image forming apparatus is allowed to print in a state where the image forming apparatus is in an off-line state where the interface is incapable of connecting with the network. The printed page number information indicates a printed page number printed by the image forming apparatus in the off-line state. In a state where the interface is in the off-line state, the controller is configured to perform printing to print one or more sheets according to a print job. When one sheet is printed, the controller is configured to increment the printed page number information by one in a case where the one sheet of paper is printed on one side printing, and increment the printed page number information by two in a case where the one sheet of paper is printed on double-sided printing. After the printed page number information is incremented, the controller is configured to determine whether the printed page number information is greater than or equal to the second upper limit page number.

According to another aspect, the disclosure provides a method for controlling an image forming apparatus including: in a state where the image forming apparatus is in an off-line state where the image forming apparatus is incapable of connecting to a network, causing the image forming apparatus to perform printing to print one or more sheets according to a print job; when one sheet is printed, incrementing a printed page number information by one in a case where the one sheet is printed on one side printing, and incrementing the printed page number information by two in a case where the one sheet is printed on double-sided printing, the printed page number information indicating a printed page number printed in the off-line state; and after the printed page number information is incremented, determining whether the printed page number information is greater than or equal to an upper limit page number that the image forming apparatus is allowed to print in the off-line state.

According to still another aspect, the disclosure provides an image forming apparatus including an interface, a main body, and a controller. The interface is configured to communicate with a network. The main body memory configured to store therein a first upper limit information and a total printed page number information. The first upper limit information indicates an upper limit of a printable page number that is defined in accordance with contents of a contract set in the image forming apparatus. The total printed page number information indicating a printed page number that are printed. The controller configured to perform printing to print one or more sheets according to a print job. When one sheet is printed, the controller is configured to increment the total printed page number information by one in a case where the one sheet is printed on one side printing, and increment the total printed page number information by two in a case where the one sheet is printed on double-sided printing. After the total printed page number information is incremented, the controller is configured to determine whether the total printed sheet number information is greater than or equal to the upper limit of the printable page number indicated by the first upper limit information.

BRIEF DESCRIPTION OF THE DRAWINGS

The particular features and advantages of the disclosure will become apparent from the following description taken in connection with the accompanying drawings, in which.

DETAILED DESCRIPTION

First Embodiment

Hereinafter, one embodiment of the present disclosure will be described with reference to FIGS. 1 through 6. The image forming apparatus 1 according to the embodiment is configured to be capable of using a consumable item or replaceable part dedicated by the contract made between the user of the image forming apparatus and a service provider. That is, the image forming apparatus according to the embodiment is such an image forming apparatus to which the subscription service is applicable.

Hereinafter, it will be assumed that the subscription service has been applied to the image forming apparatus 1 (that is, a contract has been made) insofar as there is no special description to the contrary. Further, in the following description, all kinds of the consumable item or replacement part attachable to the image forming apparatus 1 (for example, ink cartridge 4 to be described later) is assumed to be those dedicated in the contract insofar as there is special description to the contrary.

Furthermore, in the embodiment, an inkjet printer will be described as one example of the image forming apparatus. However, the image forming apparatus 1 may be other type of printers other than the inkjet printer. For example, the image forming apparatuses 1 encompasses a laser printer.

<Overall Structure of the Image Forming Apparatus>

Figure 1:
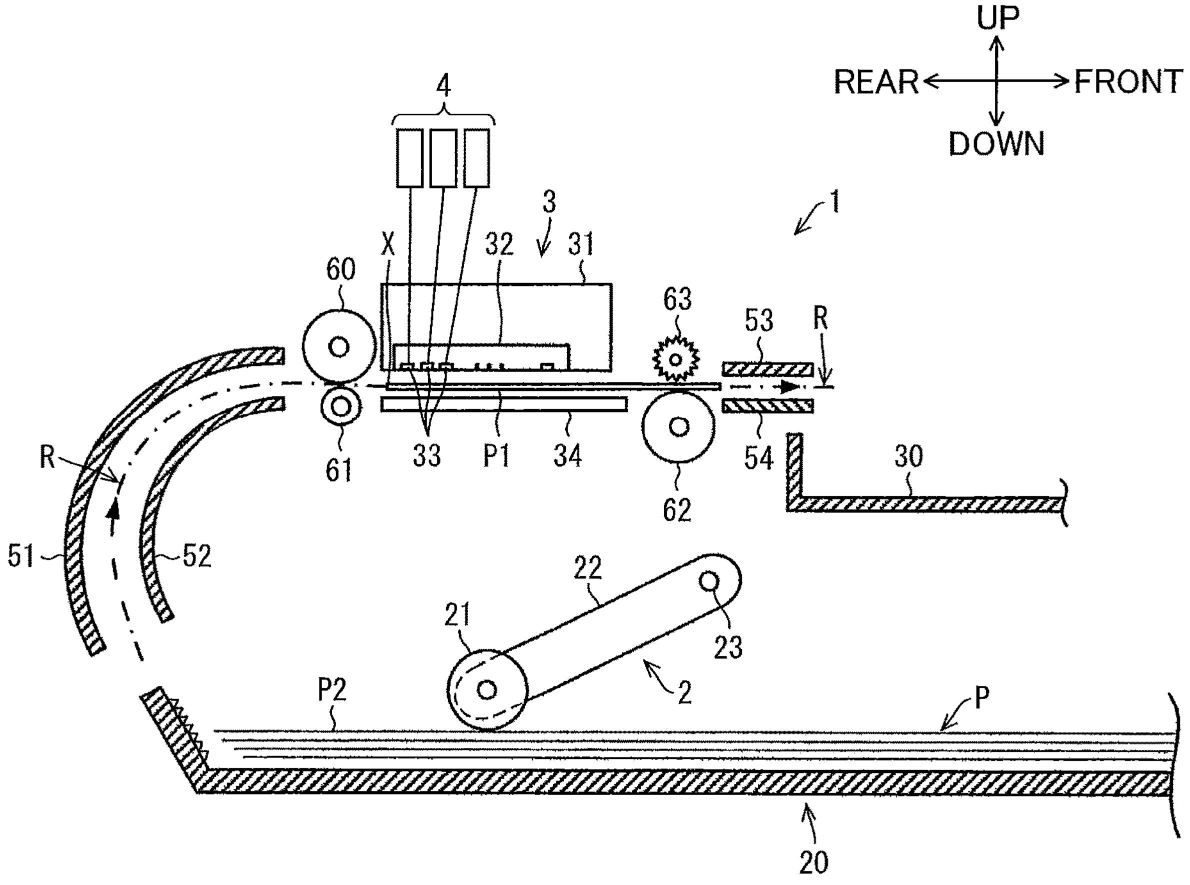
FIG. 1 is a schematic diagram showing an arrangement of an image forming apparatus in accordance with a first embodiment of the present disclosure.

FIG. 1 is a schematic diagram showing the structure of the image forming apparatus according to the embodiment. For the sake of convenience, in the following description, the upper side in FIG. 1 corresponds to the upper side of the image forming apparatus 1, the lower side in FIG. 1 the lower side of the image forming apparatus 1, the left side in FIG. 1 the rear side of the image forming apparatus 1, and the right side in FIG. 1 the front side of the image forming apparatus 1.

The image forming apparatus 1 is an inkjet printer configured to perform printing on a print sheet P by ejecting ink droplets in accordance with data. One or more ink cartridges are mounted on a main body of the image forming apparatus 1. Incidentally, other than the components depicted in FIG. 1, a display section configured from a liquid crystal display or lamp, and an input section such as button may be provided in the image forming apparatus 1. The liquid crystal display may be integral with a touch panel so as to be operable as the input section.

In the example shown in FIG. 1, the image forming apparatus 1 includes a sheet supply tray 20, a sheet supply portion 2, a conveying roller 60, a recording section 3, a discharge roller 62, and a discharge tray 30. An opening is formed in the front surface of the main body of the image forming apparatus 1. The sheet supply tray 20 is movably disposed in the opening to be movable in front/rear direction. A plenty of stacked print sheets P is accommodated in the sheet supply tray 20. The print sheet, for example, has a prescribed size. The print sheet P is not limited to a paper medium. For example, the print sheet P may be a medium made from resin material, such as an OHP sheet.

The sheet feed portion 2 is configured from a sheet feed roller 21, a sheet feed arm 22, and a shaft 23. The sheet feed portion 2 operates in such a manner that the forward rotations of the sheet feed roller 21 feed the print paper P accommodated in the sheet feed tray 20 into the conveying path R. The sheet feed roller 21 is rotatably provided in one tip end of the sheet feed arm 22. The sheet feed arm 22 is pivotally movably provided to one end portion of the shaft 23 which is supported on the frame of the image forming apparatus 1. The sheet feed arm 22 pivotally moves toward the sheet feed tray 20 and urges the same by its own weight or by resilient force of a spring or the like. A driving force is generated by reversible rotations of a motor (not shown) disposed in the image forming apparatus 1 and is transmitted to the sheet feed roller 21, resulting in forward rotations of the sheet feed roller 21.

The conveying path R is a space formed with guide members 51, 52, the recording section 3, and another guide members 53, 54.

A feed roller 60 is disposed in upstream of the recording section 3 in the conveying direction. A pinch roller 61 is disposed in opposition to the lower part of the feed roller 60. The feed roller 60 rotates by the driving power generated by the motor of the image forming apparatus 1. The pinch roller 61 rotates following the rotations of the feed roller 60. Forward rotations of the feed roller 60 and the pinch roller 61 (forward rotations of the feed roller 60 and the following rotations of the pinch roller 61) cause the print paper P to move toward the image recording position “x” in the conveying path R while holding the print paper P between the feed roller 60 and the pinch roller 61. The image recording position “x” is a position to carry out image recordation on the print paper P. Transmission of the driving power generated by the forward rotations of the motor of the image forming apparatus 1 causes the feed roller 60 to rotate forwardly, whereas transmission of the driving power generated by the reverse rotations of the motor of the image forming apparatus causes the feed roller 60 to rotate reversely. Incidentally, the forward rotations of the motor of the image forming apparatus 1 correspond to a first direction, and the reverse rotations of the motor of the image forming apparatus correspond to a second direction.

The recording section 3 is disposed between the feed roller 60 and the discharge roller 62 both in the conveying path R. The recording section 3 includes a carriage 31, a recording head 32, a plurality of nozzles 33, and a platen 34. Each nozzle 33 is fluidly connected to the relevant ink cartridge 4. Note that the numbers of nozzles and the ink cartridges 4 are not limited for no particular reason.

The ink cartridge 4 has a cartridge housing. The cartridge housing is attachable to the main body of the image forming apparatus 1. The ink cartridges 4 separately contain different color ink as materials used for image formation (for example, cyan, magenta, yellow and black). Ink is a consumable material consumed whenever printing is performed.

The carriage 31 is configured to be reciprocally movable in a direction orthogonal to the conveying direction, that is, in the widthwise direction of the print paper P. In the image recordation on the print paper P, the image forming apparatus 1 performs recordation of one-line worth of image on the print paper P by ejecting ink droplets from the nozzles 33 of the recording head 32 while moving the carriage 31 in the widthwise direction of the print paper P. The printing is performed under the condition in which the conveyance of the print paper P is being stopped. As a process for starting a new line printing, the image forming apparatus 1 feeds the print paper P for a prescribed amount by driving the feed roller 60 and the discharge roller 62. The image forming apparatus 1 alternately repeats the process for recordation and the process for starting a new line printing.

As shown in FIG. 1, the recording head 32 is mounted on the carriage 1. The plurality of nozzles 33 is formed in the lower surface of the recording head 32. The recording head 32 operates to eject ink droplets from the nozzles 33. The platen 34 is a rectangular, plate-shaped member on which the print paper P is supported. Images are recorded on the print paper P by the recording head 32 selectively ejecting ink droplets during the movements of the carriage 31 relative to the print paper P supported on the platen 34.

The discharge roller 62 is disposed downstream of the recording section 3 in the conveying direction. A spur 63 is disposed in opposition to the upper part of the discharge roller 62. The discharge roller 62 is driven by the motor provided in the image forming apparatus 1. The spur 63 rotates following the rotations of the discharge roller 62. Forward rotations of the discharge roller 62 and the spur 63 (rotations of the discharge roller 62 and the following rotations of the spur 63) discharge the print paper P onto the discharge tray 30 while holding the print paper P between the discharge roller 62 and the spur 63.

The discharge tray 30 is disposed above the sheet feed tray 20. The discharge tray 30 supports the print paper P discharged by the discharge roller 62.

<Internal Structures of Image Forming Apparatus, Ink Cartridge 4 and Server 9>

Figure 2:
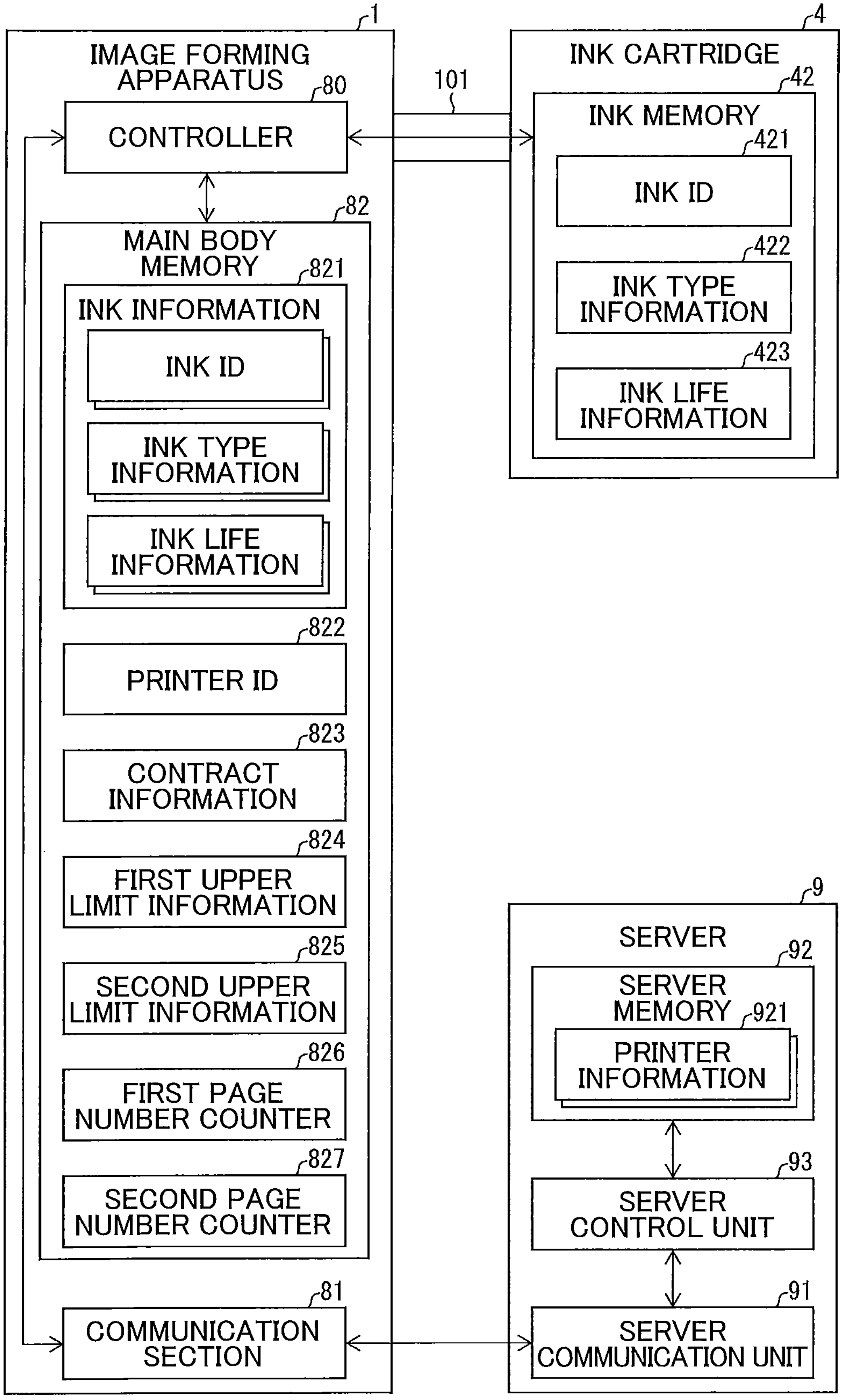
FIG. 2 is a block diagram showing essential arrangements of the image forming apparatus, an ink cartridge, and a server in accordance with the first embodiment.

FIG. 2 is a block diagram showing essential structures of the image forming apparatus 1, ink cartridge 4, and a server 9 according to the embodiment.

<Ink Cartridge>

The ink cartridge 4 has an ink memory 42 (an example of a first memory). Reading data from and writing data into the ink memory 42 can be done. A flash ROM or EEPROM (registered trademark) are examples of the ink memory 42.

The ink memory 42 has a first region 421 for storing information about the ink cartridge, a second region 422, and a third region 423. The first region 421 stores an ink ID. The second region 422 stores an ink type information. The third region 423 stores ink service-life information. The third region may be a data rewritable region. Incidentally, the ink ID and the ink service-life information are not requisite information in the present disclosure.

The ink ID is, for example, a serial number uniquely assigned to individual ink cartridge 4 for discrimination from others. The ink type information indicates either a contract-dedicated ink cartridge 4 or a normal type ink cartridge 4. The "contract-dedicated cartridge" refers to an ink cartridge supplied to the user from a service provider, where a contract to this effect has been made regarding the image forming apparatus between the user and the service provider. On the other hand, the "normal type ink cartridge" refers to an ink cartridge other than the contract-dedicated cartridge. For example, the normal type ink cartridge is on sale in a generally accessible market. The ink service-life information refers to information about the residual amount of ink.

The main of the image forming apparatus has a connector 101. When the ink cartridge 4 is attached to the main body of the image forming apparatus 1, the connector 101 is brought into electrical contact with the ink memory 42, whereby the controller 80 of the image forming apparatus 1 is capable of communicating with the ink memory 42 of the ink cartridge 4.

<Image Forming Apparatus 1>

The image forming apparatus 1 includes the controller 80, a communication section 81, and a main body memory 82. The controller 80 has, for example, an ASIC (Application Specific Integrated Circuit). The controller 80 is electrically connected to both the main body memory 82 provided in the main of the image forming apparatus 1 and the communication section 81. The controller 80 executes various kinds of processes, thereby making the image forming apparatus 1 execute various kinds of processes in association with printing. The controller 80 may control the sheet supply portion 2, conveying roller 60, recording section 3, and discharge roller 62 to perform printing operation.

Incidentally, the controller 80 may have a processor, such as a CPU. In this case, control programs are stored in the main body memory 82 for implementing method of image forming control. The processor operates in accordance with the control programs, thereby making the image forming apparatus 1 perform various kinds of processes.

The controller 80 may have a computer-readable storage medium for storing control programs. As such storage medium, "tangible medium of the type not temporarily storing data" can be used, such as ROM (Read Only Memory), tape, disk, card, semiconductor memory, programmable logic circuit. In other words, the controller 80 has a non-transitory storage medium storing a set of program instructions installed on and executed by the controller 80. A RAM (Random access Memory) may also be used for developing the control programs therein. The control programs may be supplied to the computer through an arbitrarily selected transfer medium capable of transmitting the control programs (communication network or broadcasting waves). According to one embodiment of the present disclosure, the transfer of the control programs can be embodied by electronic transfer of the control programs by way of the data signal superposed on a carrier.

When the ink cartridge 4 is attached to the image forming apparatus 1, the ink cartridge 4 is brought to electrical connection to the controller 80 as shown in FIG. 2, thereby allowing the controller 80 to execute an information retrieving process to retrieve information from the ink memory 42 and also an information writing process (a rewriting process inclusive).

The main body memory 82 is such a memory that can read information therefrom and write information thereinto. The main body memory 82 is, for example, configured from a flash ROM or EEPROM (registered trademark). The main body memory 82 has a region 821 for storing ink information, a region 822 where the printer ID is stored, a region 823 where the contract information is stored, a region 824 where a first upper limit information is stored, a region 825 where a second upper limit information is stored, a region 826 where a first page number counter is stored, and a region 827 where a second page number counter is stored.

The ink information includes linked information about each of the ink cartridges 4 linking the ink ID read from the ink memory 42 of the ink cartridge 4, the ink type information, and the ink service-life information.

The printer ID is discriminating information for discriminating the image forming apparatus from others. For example, a serial number assigned to each image forming apparatus is used as the printer ID.

The contract information indicates contents of the contract of the image forming apparatus 1. More specifically, the contract information indicates whether the image forming apparatus 1 is under the contract or not under the contract (normal image forming apparatus 1). According to the present embodiment, the contract information indicates whether the image forming apparatus 1 is set to a contract mode or the image forming apparatus 1 is set to a normal mode. Note that the contract mode represents that the image forming apparatus 1 is under the contract whereas the normal mode represents that the image forming apparatus 1 is not under the contract. The contract information may be rewritten to a new content via the server 9 in the case where the user of the image forming apparatus 1 changes the contents of the contract.

According to the embodiment, the contract information indicates that the image forming apparatus 1 is either under the contract mode or under the normal mode. In the contract mode, the contract information further indicates whether the printing can be performed in the off-line state or the print cannot be performed in the off-line state. When the image forming apparatus 1 is under the contract mode, the image forming apparatus 1 can use not only the contract-dedicated cartridge but also normal type cartridge. On the other hand, when the image forming apparatus 1 is under the normal mode, the image forming apparatus 1 cannot use the contract-dedicated cartridge but can use the normal type cartridge.

The contract mode may have a plurality of kinds. For example, the upper limit of the number of printable pages represented by the first upper limit information and the upper limit of the number of the printable pages represented by the second upper limit information may increase or decrease according to the kind of the contract mode. The first upper limit information and the second upper limit information will be described later. For example, "first contract mode" and "second contract mode" may be defined such that the upper limit of the number of printable pages represented by the first upper limit information and the upper limit of the number of printable pages represented by the second upper limit information for the "first contract mode" are larger than those for the "second contract mode". Further, when the contract mode is set to the image forming apparatus 1, the contract information may include information about the kind of the contract mode as well.

More specifically, according to the present embodiment, the contract information represents either one of the "contract mode", "contract mode and off-line printing being stopped", and "normal mode". The "contract mode" represents a mode in which the image forming apparatus 1 is under the contract, and printing can be performed using the contract-dedicated cartridge. The "contract mode and off-line printing being stopped" represents a mode in which the image forming apparatus 1 is under the contract, print can be performed using the contract-dedicated cartridge, and additionally printing cannot be performed in the off-line state. The "normal mode" represents a mode in which either no contract is made to the image forming apparatus 1 or the contract-dedicated consumable material or replaceable part cannot be used. Thus, according to the present embodiment, the main body memory 82 can store the contract information that indicates the contents of the contract and additionally indicates whether the image forming apparatus 1 is currently being capable of performing printing.

The first upper limit information represents information indicating a printable page number determined in accordance with the kind of the contract mode. More specifically, the first upper limit information represents an upper limit of the number of pages that the image forming apparatus 1 can print during a period of time determined in the contract. The "period of time determined in the contract" is not limited to a particular duration. The duration may be, for example, one month. When the contents of the contract (that is, the contract mode) of the image forming apparatus 1 are changed, the first upper limit information may be rewritten via the server 9. Hereinafter, the upper limit of the number of pages represented by the first upper limit information will occasionally be referred to as "first upper limit page number".

When the image forming apparatus 1 is in the normal mode, the upper limit of the page number represented by the first upper limit information may be set to none (no limitation) or maximum. By so setting, the image forming apparatus 1 operates in the normal mode to be capable of printing without any limitation in print number insofar as normal type ink cartridge 4 is used.

The second upper limit information indicates the upper limit of the printable page number when the image forming apparatus 1 is in the-off-line state. More specifically, the second upper limit information indicates the upper limit of the number of pages that the image forming apparatus can print when the image forming apparatus 1 is in the-off-line state. Similarly to the first upper limit information, when the contents of the contract (kind of the contract mode) of the image forming apparatus 1 are changed, the second upper limit information may be rewritten via the server 9. When the image forming apparatus 1 is in the normal mode, the upper limit of the printable page number represented by the second upper limit information may be set to none (no limitation) or maximum. By so setting, the image forming apparatus 1 operates in the normal mode to be capable of printing without any limitation in print number insofar as normal type ink cartridge 4 is used. Hereinafter, the upper limit of the printable page number represented by the second upper limit information will occasionally be referred to as "second upper limit page number".

Each of the first upper limit page number and the second upper limit page number is not limited to a particular value. However, it is desirable that the first upper limit page number be greater than the second upper limit page number.

The first page number counter is one example of the total printed page number information. The first page number counter is such a counter that counts the total number of pages that are printed irrespective of the connection status in the network of the image forming apparatus 1. In the present embodiment, the first page number counter counts the number of pages printed during a predetermined period of time determined in the contract of the image forming apparatus 1. Hereinafter, the counted value counted by the first page number counter will occasionally be referred to as "first printed page number".

The second page number counter is an example of the printed page number information. The second page number counter counts the number of pages printed in an off-line status. In other words, the second page number counter is information indicating the number of pages in the off-line state. When the image forming apparatus 1 shifts from the off-line state to the on-line state, the second page number counter is reset to an initial value. The initial value of the second page number counter is zero (0). Hereinafter, the count value in the second page number counter will occasionally be referred to as "second printed page number".

Other than those described above, the main body memory 82 may store, for example, information indicting cumulative printed page number printed by the image forming apparatus 1.

The communication section 81 is a communication interface for the communication between the image forming apparatus 1 and the server 9. The communication section 81 outputs a request received from the server 9 to the controller 80. Here, the "request" is for requesting the image forming apparatus 1 to send status data of the image forming apparatus 1 to the server 9. The communication section 81 transmits the status data inputted from the controller 80 to the server 9. Here, the "status data" refers to data with regard to the operating status of the image forming apparatus 1 and includes at least printer discriminating information, and further at least one of count value in the first page number counter and the cumulative printed page number printed by the image forming apparatus 1. Other than those mentioned above, the status data may include the count value of the second page number counter.

<Server 9>

The server 9 operates as a managing apparatus managing one or more image forming apparatuses 1. While the server 9 is connected to only one image forming apparatus 1 in the example shown in FIG. 1, the server 9 may be connected so as to be communicable with a plurality of image forming apparatuses 1.

The server 9 includes a server communication unit 91, a server memory 92, and a server control unit 93. The server communication unit 91 is a communication interface for communications between the server 9 and the image forming apparatus 1. The server communication unit 91 transmits the request inputted from the server control unit 93 to the image forming apparatus 1. The server communication unit 91 receives the status data transmitted from the image forming apparatus 1 in response to the request, and outputs the received status data to the server communication unit 91.

The server control unit 93 is a CPU (Central Processing Unit) for performing an overall control on the server 9. The server control unit 93 creates, at prescribed timings, requests for requesting the image forming apparatus 1 to send status data of the image forming apparatus 1 to the server 9, and outputs the created requests to the server communication unit 91.

Further, the server control unit 93 stores the status data received via the server communication unit 91 in the server memory 92. More specifically, the server control unit 93 stores the status data transmitted from the image forming apparatus 1 in the server memory 92 as printer information.

The server memory 92 is a storage device for storing data needed to operate the server 9. The server memory 92 has a region 921 for storing the printer information. The printer information is data including various pieces of information regarding the image forming apparatus 1 formulated en bloc. The printer information of the plurality of image forming apparatuses is stored separately on an apparatus basis. The printer information includes at least printer ID, contract information, and status data. The printer information may additionally include, for example, mode number, and manufactured year/month/date.

<Flows of Various Kinds of Processes>

Next, flows of various kinds of processes executed by the controller 80 of the image forming apparatus 1 will be described while referring to FIG. 3 through FIG. 6. The controller 80 of the image forming apparatus 1 is executing a connection monitoring process while power source of the image forming apparatus 1 is in the ON state. The connection monitoring process is a process for monitoring whether the image forming apparatus 1 is in a state that the image forming apparatus 1 is connectable to the network.

Additionally, the image forming apparatus 1 executes a term renewal process every predetermined period of time. The term renewal process is a process for renewing or updating the term for the contract when the period of time specified in the contract of the image forming apparatus 1 is expired.

In response to a print job received through an input section, the image forming apparatus 1 executes a print process for the received input job. Hereinafter, a process executed from receipt of the print job until the end of print corresponding to the received print job will occasionally be referred to as "print associated process".

<Connection Monitoring Process>

Figure 3:
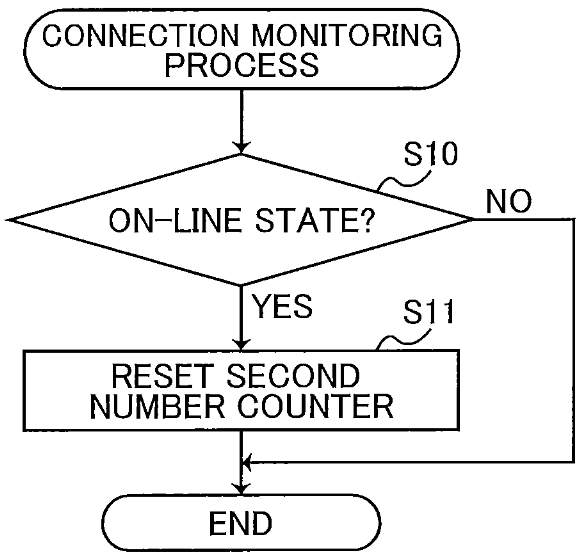
FIG. 3 is a flowchart illustrating a flow of a connection monitoring process.

FIG. 3 is a flowchart illustrating a flow of the connection monitoring process. First of all, the controller 80 determines whether the image forming apparatus 1 is in the on-line state (S10). The on-line state is a state in which the communication section 81 of the image forming apparatus 1 is connected to the network. On the other hand, the off-line state is the state in which the communication section 81 is incapable of connecting to the network. In other words, the on-line state is a state in which the communication section 81 is communicably connected to the server communication section 91 whereas the off-line state is a state in which the communication section 81 is not communicably connected to the server communication section 91.

When the controller 80 does not determine that the image forming apparatus 1 is in the on-line state (S10: NO), that is, when the image forming apparatus is in the off-line state, the controller 80 does not execute any particular processes and waits until a timing at which the connection monitoring process is executed again.

On the other hand, when the controller 80 determines that the image forming apparatus 1 is in the on-line state (S10: YES), the controller 80 resets the second page number counter stored in the main body memory 82 to zero (0) (S11: reset process). Incidentally, in the case where the second page number counter has already been zero (0), the process in S11 may be dispensed with by the controller 80.

Resetting the second page number counter at the time of the on-line status enables the controller 80 to start counting the print number in the off-line state from zero (0) when the status of the image forming apparatus 1 is changed to the off-line state.

The timing at which the connection monitoring process is executed by the controller 80 and an interval by which the connection monitoring process is executed are not limited in particular. However, when the communication connection status of the image forming apparatus 1 is shifted from the on-line state to the off-line state or vice versa, it is desirable that the connection monitoring process be executed at a relevant frequency capable of detecting the status of the communication connection without delay.

<Term Renewal Process>

Figure 4:
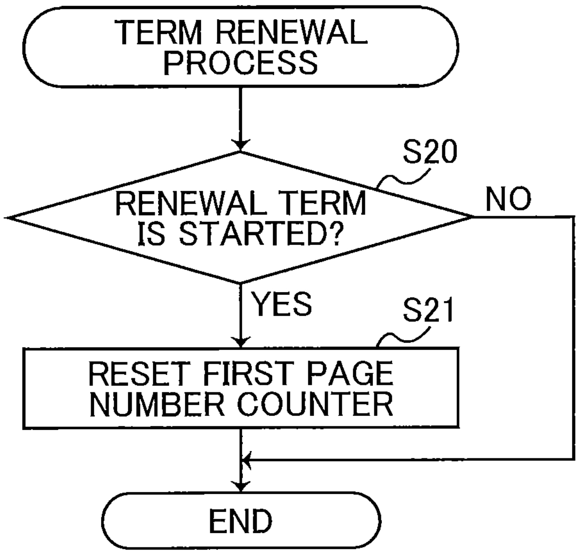
FIG. 4 is a flowchart illustrating a flow of a term renewal process.

FIG. 4 is a flowchart illustrating the flow of the term renewal process.

The controller determines whether a process for a renewal term has started (S20). The start of the renewal term means that after the term specified in the contract has expired and the succeeding term has started. The controller 80 may determine that the term has newly started by recognizing the day and time by, for example, a timer (not shown) provided in the image forming apparatus 1. Alternatively, the controller 80 may determine that the term is newly started based on the information about the day and time supplied from the server 9 through the communication section 81.

When the controller 80 does not determine that the renewal term has started (S20: NO), the controller 80 waits for the timing at which the term renewal process is executed again. On the other hand, when the controller 80 determines that the renewal term has started (S20: YES), the controller 80 resets the first page number counter stored in the main body memory 82 (S21).

<Print Associated Process>

Figure 5:
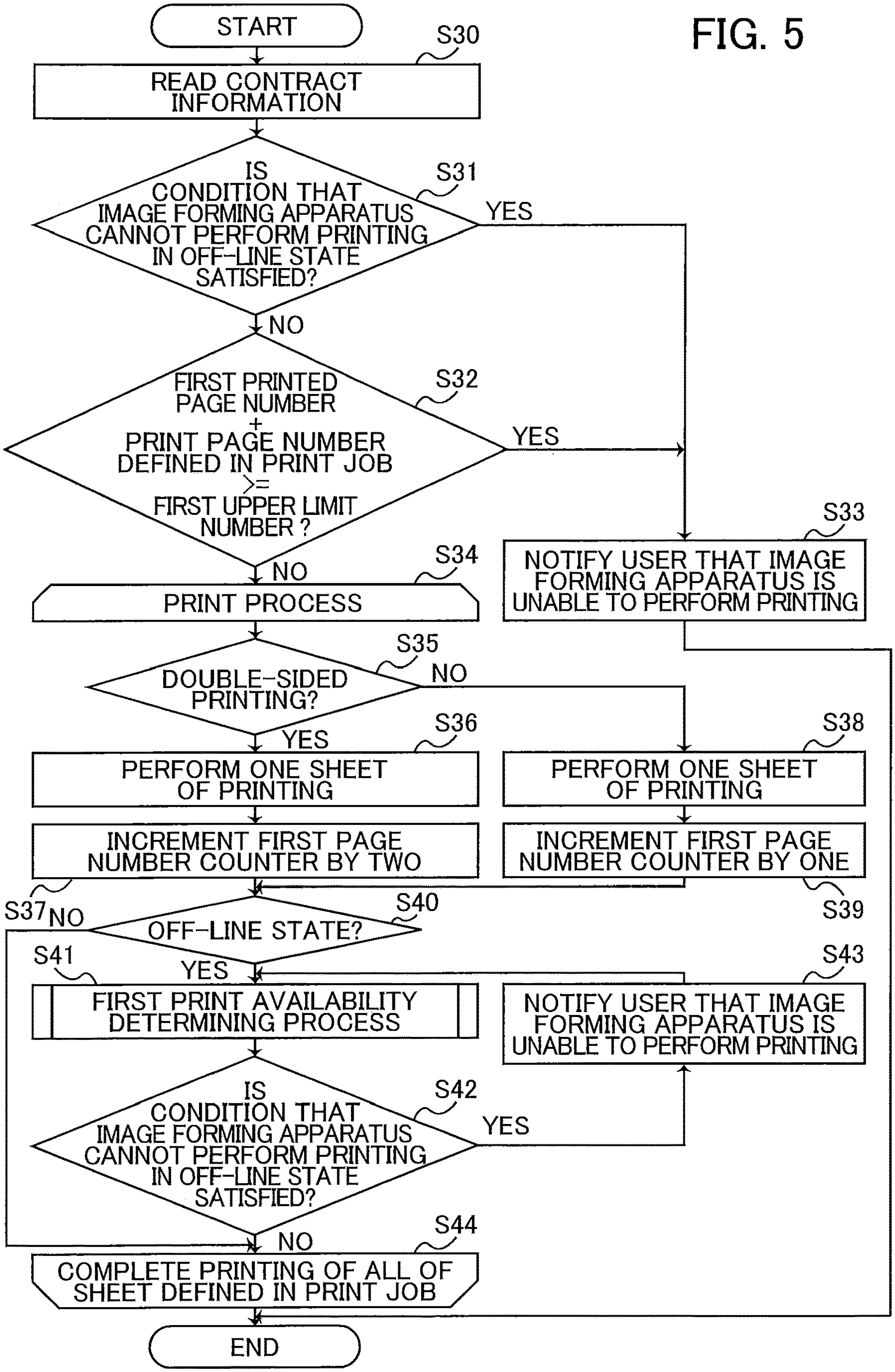
FIG. 5 is a flowchart illustrating a flow of a print associated process according to the first embodiment.

FIG. 5 is a flowchart illustrating a flow of the print associated process. A series of processes shown in the flowchart of FIG. 5 starts with receipt of the print job by the image forming apparatus 1 operating as a trigger.

When the print job is received, the controller 80 reads the contract information stored in the main body memory 82 (S30), whereupon the controller 80 determines whether a condition that the image forming apparatus 1 cannot perform printing in the off-line state is satisfied (S31). When the controller 80 determines that the printing cannot be performed with the image forming apparatus 1 being in the off-line state (S31: YES), the controller 80 notifies the user that the image forming apparatus 1 is unable to perform printing (S33). For example, the controller 80 displays a message on the display section of the image forming apparatus 1 notifying that the printing cannot be performed.

As will be described in detail later, when the image forming apparatus 1 is in the off-line state, the process in FIG. 5 repeatedly executes a first print availability determining process (S41). When the off-line state is shifted to the on-line state, the controller 80 escapes from the loop of the process of S41 and updates the contract information such that the updated contract information indicates that the image forming apparatus 1 can perform printing (S416 in FIG. 6 which will be described later). As such, when the print associated process is started in the on-line state of the image forming apparatus 1, the controller 80 definitely determines that S31 is "NO".

On the other hand, when the controller 80 does not determine that the image forming apparatus 1 is incapable of printing in the off-line state (S31: NO), the controller 80 subsequently reads the value of the first page number counter and the first upper limit page number stored in the main body memory 82. Then, the controller 80 determines whether the total value of the first printed page number and the print page number defined in the print job to be executed is greater than or equal to the first upper limit page number (S32: second determining process).

The determination of "YES" made by the controller 80 in S32 indicates that execution of the print job defined in the print job intended to execute from now on will result in reaching the first upper limit page number that is printable within the term specified in the contract of the image forming apparatus 1. Accordingly, when determination is made to "YES" in S32, the controller 80 does not execute the successive print process and notifies the user that printing cannot be performed using the display section (S33).

The contents of the notification made when S31 is "YES" and the contents of the notification made when S32 is "YES" may be different from each other. For example, when the determination made in S31 is "YES", the controller 80 may display in the display section a message reading "Printing cannot be performed in the off-line state". On the other hand, when determination made in S32 is "YES", the controller 80 may display in the display section a message reading "Printing is no longer performable because the upper limit page number printable within the contract term will be reached".

On the other hand, determination made in S32 by the controller 80 being "NO" indicates that execution of the print process defined in the print job to be executed from now on will not reach the first upper limit page number printable within the term specified in the contract of the image forming apparatus 1. Accordingly, when determination made in S32 is "NO", the controller 80 starts the print process defined in the print job.

After start of the print job, the processes in S35 to S43 are executed by the controller 80 every time when one sheet of paper is printed. First of all, the controller 80 refers to the print job and determines whether the print mode for one sheet of paper to be printed from now on is double-sided printing (S35). When the controller 80 determines that the double-sided print is to be performed (S35: YES), the controller 80 performs one sheet of printing in double-sided print (S36) and increments the first page number counter of the main body memory 82 by two (two sheets of paper) (S37: increment process).

On the other hand, when the controller 80 does not determine that the double-sided print is to be performed (S35: NO), the controller 80 performs one sheet of printing in single-sided print (S38) and increments the first sheet number counter of the main body memory 82 by one (one sheet of paper) (S39: increment process).

Subsequently, the controller 80 confirms that the image forming apparatus 1 is in the off-line state (S40). When the controller 80 determines that the image forming apparatus 1 is not in the off-line state (S40: NO), that is, determines to be in the on-line state, the controller 80 performs subsequent one sheet of printing. That is, the controller returns to S35 and repeatedly executes the relevant process. When the controller 80 completes printing of all of the pages defined in the print job, the controller 80 escapes from the print process loop in S34 and ends the process (S44).

On the other hand, when the controller 80 determines that the image forming apparatus 1 is in the off-line state (S40: YES), the controller 80 executes a first print availability determining process (S41). The first print availability determining process indicates a determining process for determining whether print can be performed or not in the off-line state. Details of the first print availability determining process will be described later.

As a result of printability determination, when the controller 80 determines that printing cannot be performed in the off-line state (S42: YES), the controller 80 notifies the user of the print incapability through the display section or the like (S43). The notification contents in S43 may be different from those notified in S33. Note that the process executed in S43 is not requisite. After execution of S43, the controller 80 executes the first print availability determining process again (S41). That is, the controller 80 interrupts printing and executes a loop of S41 through S43 until the second page number counter is reset in response to the off-line state being changed into the on-line state (S11 in FIG. 3).

In the case where the printing performed in S36 or S38 corresponds to the printing for the last sheet of paper defined in the print job, when the determination made in S42 is YES, the processes fall in the loop in S41 through S43. Accordingly, even though the image forming apparatus 1 accepts a new print job, the print associated processes with respect to the new print job does not start insofar as the results of determination in S41 indicate that print can be performed in the off-line state. With such processes, even though printing for all sheets of paper defined in the print job is completed in S36 or S38, printing for the next print job can be stopped.

On the other hand, when the controller 80 determines that printing can be performed as a result of the first print availability determination process (S42: NO), the controller 80 performs printing of the subsequent one sheet. That is, the controller 80 returns to S35 and repeatedly executes the processes S35 et seq. Incidentally, when the controller completes printing to all pages defined in the print job, the controller escapes from the print process loop in S34 and ends the processes.

<First Print Availability Determining Process>

Figure 6:
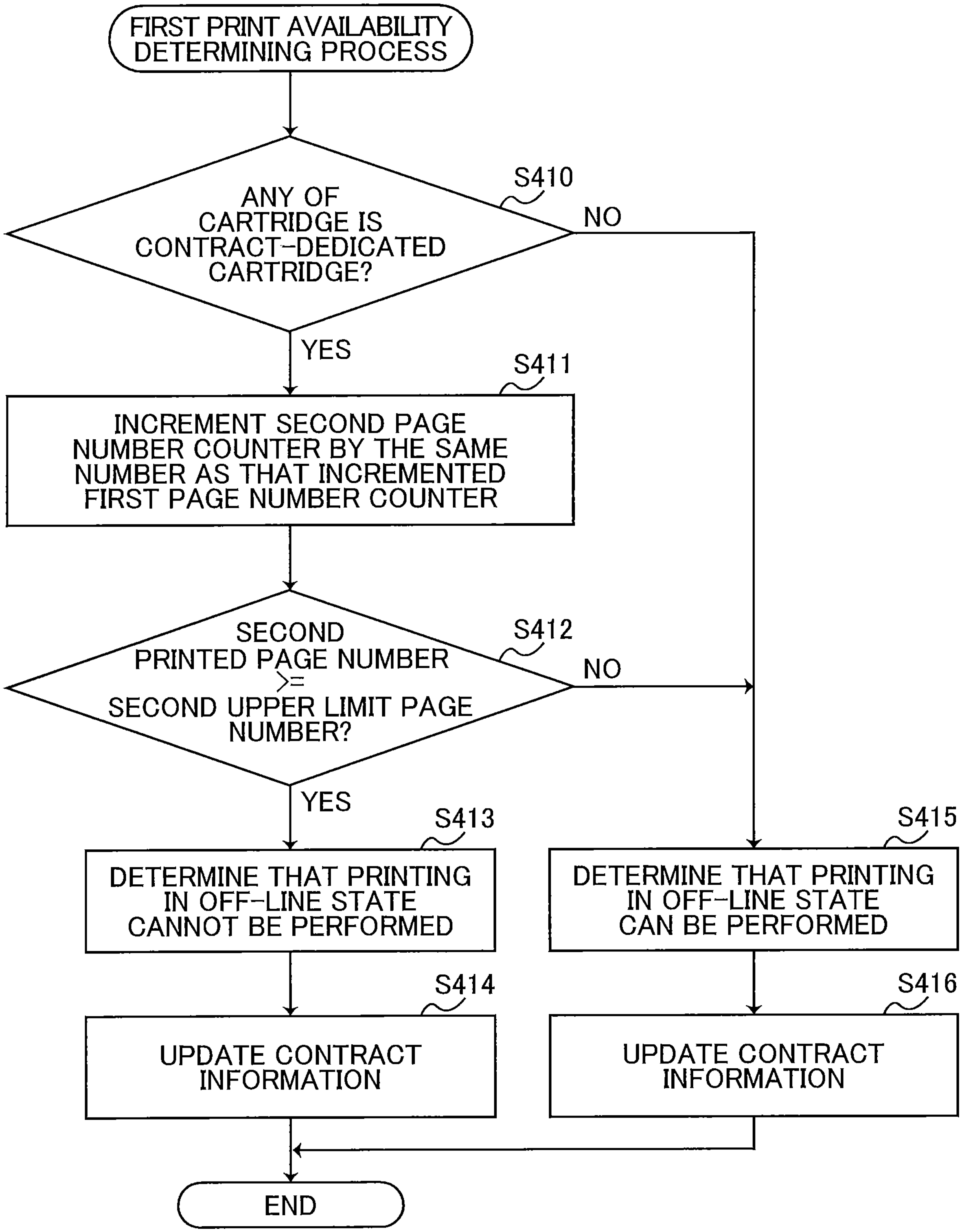
FIG. 6 is a flowchart illustrating a flow of a first print availability determining process according to the first embodiment.

FIG. 6 is a flowchart illustrating a flow of first print availability determining process. First of all, the controller 80 reads the ink type information stored in the main body memory 82, so that the image forming apparatus 1 can recognize that any of the ink cartridges 4 attached to the image forming apparatus 1 is the contract-dedicated cartridge (S410).

When the controller 80 recognizes that at least one of the cartridges is the contract-dedicated cartridge (S410: YES), the controller 80 increments the second page number counter by the same number as that incremented in the first page number counter in S37 or S39 of FIG. 5 (S411). More specifically, the controller 80 increments the second page number counter by two in the case of double-sided printing, and increments the second page number counter by one in the case of one side printing.

Subsequently, the controller 80 determines whether the second printed page number that is obtained through incrementing in S411 is greater than or equal to the second upper limit page number (S412: first determining process). When the controller 80 determines that the second printed page number is greater than or equal to the second upper limit page number (S412: YES), the controller 80 determines that printing in the off-line state to be executed in S412 et seq cannot be performed (S413). The controller 80 updates the contract information stored in the main body memory 82 to the context that the contract is being effective and the off-line printing is being stopped (S414: print inhibition process). In other words, the controller 80 inhibits execution of printing in step S412 et seq in the off-line state. This can limit the number of pages that the image forming apparatus 1 can print in the off-line state.

On the other hand, when the controller 80 determines that the second printed page number is smaller than the second upper limit page number (S412: NO), the controller 80 determines that printing in the off-line state can be performed (S415). The controller 80 updates the contract information stored in the main body memory 82 to "normal" (S416: print approval process). In other words, the controller 80 approves printing in the off-line state to be executed in S412 et seq. According to the present embodiment, the number of printed pages is counted each time a print process is executed on one sheet of paper. Regardless of whether the printing is in the double-sided printing or in the one side printing, after the print process is executed on one sheet of paper, the image forming apparatus 1 determines whether the execution of the printing on the one sheet has caused the number of printed pages to reach the second upper limit page number, which indicates the upper limit of the page number printable by the image forming apparatus 1 in the-off-line state. Therefore, for example, even though the second upper limit page number will be reached with one more page, the image forming apparatus 1 does not determine whether the second upper limit page number is reached after only one side of a sheet printed and before the other side of the sheet is printed. In other words, the image forming apparatus 1 does not determine that the second upper limit page number is reached while one sheet is being printed with the double-side printing. Hence, the image forming apparatus can manage the number of print pages during the off-line state without losing the user's convenience as much as it can be. According to the present embodiment, in a state where the image forming apparatus 1 is in the off-line state, the image forming apparatus 1 starts performing printing when the sum of the total printed page number and the print page number defined by the print job is greater than or equal to the upper limit of the printable page number which is defined in accordance with the contents of the contract set in the image forming apparatus, and thereafter determines whether the number of printed pages has reached the number of printable pages that can be printed in the off-line state.

When the controller 80 does not determine that at least one ink cartridge is the contract-dedicated cartridge (S410: NO), that is, all cartridges are the normal type cartridges, the controller 80 determines that printing can be performed in the off-line state (S415), and updates the contract information in the main body memory 82 to "normal" (S416). Stated differently, the controller 80 approves printing in the off-line state to be executed in S15 et seq. By so doing, printing in the off-line state can be performed by replacing all the cartridges to the normal ones even in the image forming apparatus 1 under the contract. Accordingly, user-friendliness can be enhanced.

Second Embodiment

Another embodiment of the present disclosure will be described hereinafter. For the sake of convenience of description, the members described in the above embodiment and those having the same function will be denoted by the same reference numerals and duplicate description will not be repeated.

The image forming apparatus 1 may be a laser printer. In the laser printer embodying the image forming apparatus 1, a drum cartridge and a toner cartridge are attached to the image forming apparatus 1, rather than attaching the ink cartridge 4. Note that there is no particular limitation in the number of each of the drum cartridge and the toner cartridge to be attached to the image forming apparatus 1. Also, there is no particular limitation in the structure of each of the drum cartridge and the toner cartridge.

For example, the drum cartridge and the toner cartridge may be the cartridges independent one from the other.

Alternatively, the drum cartridge and the toner cartridge may be integrally structured by attaching the toner cartridge to the drum cartridge. The toner cartridge is inserted into the housing of the image forming apparatus 1 together with the drum cartridge in the state that the toner cartridge is attached to the drum cartridge.

For the case in which the drum cartridge and the toner cartridge are independent one from the other, it is desirable that the structure of each of the drum cartridge and the toner cartridge be either one of the following three categories.

One category may be structured in such a manner that the drum cartridge has a cartridge housing in which a photosensitive drum, a drum memory, and a developing roller are provided. The toner cartridge may have a cartridge housing in which a toner memory is provided. The cartridge housing of the toner cartridge accommodates toner therein. In the interior of the drum cartridge, the outer peripheral surface of the developing roller is in contact with the surface of the photosensitive drum, so that developing agent (that is, toner) is deposited on the surface of the photosensitive drum. The toner deposited thereon is transferred onto a sheet of paper by virtue of a transfer belt. Data indicated in the print job is thus printed.

The second category may be structured in such a manner that the photosensitive drum and the drum memory are provided within the cartridge housing of the drum cartridge. The developing roller may be provided within the cartridge housing of the toner cartridge. In the interior of the drum cartridge, the outer peripheral surface of the developing roller is in contact with the outer surface of the photosensitive drum.

The third category may be structured to attach a developer cartridge having a developing roller separate from the drum cartridge and the toner cartridge. In such a case, the drum cartridge includes a cartridge housing, a photosensitive drum, and a drum memory. The toner cartridge has a cartridge housing and a toner memory. The cartridge housing of the toner cartridge accommodates toner therein. In the third category, three cartridges, that is, the drum cartridge, the toner cartridge, and the developing cartridge, are inserted into the main body.

The drum memory stores, for example, a drum ID, a drum type information, and a drum service-life information. The drum ID and the drum service-life information are not requisite information in this disclosure. The drum type information indicates whether the drum cartridge is a contract-dedicated drum cartridge or a normal drum cartridge.

The toner memory stores, for example, a toner ID, a toner type information, and a toner service-life information. Note that the toner ID and the toner service-life information are not requisite information in this disclosure. The type information indicates whether the toner cartridge is the contract-dedicated cartridge or the normal toner cartridge.

In the laser printer embodying the image forming apparatus 1, the main memory stores the drum information and the toner information in lieu of the ink information. The drum information is information linking the drum ID read from the drum memory of each drum cartridge, the drum type information, and the drum service-life information. The toner information is information linking the toner ID read from the toner memory of each toner cartridge, the toner type information, and the toner service-life information.

Specifically, the drum cartridge and the toner cartridge may be an integral type cartridge such that the drum cartridge and the toner cartridge are integrally structured. Such an integral type cartridge includes a cartridge housing, a photosensitive drum, a memory, and a developing roller. In the interior of the integral type cartridge, the outer peripheral surface of the developing roller is in contact with the outer peripheral surface of the photosensitive drum. The cartridge housing of the integral type cartridge accommodates toner therein. The memory of the integral type cartridge stores various kinds of information stored in the aforesaid drum memory and the toner memory.

To the laser printer embodying the image forming apparatus 1, the flow of the processes shown in FIGS. 3 through 6 are equally applicable. Concretely, in the laser printer embodying the image forming apparatus 1, the word of the ink cartridge 4 appearing in FIGS. 3 through 6 may be replaced with a drum cartridge and toner cartridge (or integral type cartridge).

For the laser printer embodying the image forming apparatus 1, ink memory 42 appearing in FIGS. 3 through 6 may be replaced with the drum memory and the toner memory. Further, in the laser printer embodying the image forming apparatus 1, the word ink type information appearing in FIGS. 3 through 6 may be replaced with the drum type information and the toner type information. The image forming apparatus according to the present embodiment takes similar effects to the image forming apparatus 1 according to the first embodiment.

In the first and second embodiments, determination can be made as to whether the number of printed pages has reached the upper limit page number or more as specified in the second upper limit information when the image forming apparatus 1 is brought into the off-line state. Due to such determination, it is possible to determine whether performing one sheet printing results in reaching the printable upper limit page number in the off-line state whichever double-sided printing or one-side printing is performed with the image forming apparatus 1. In a modification, the main body memory 82 of the image forming apparatus 1 may store the first upper limit information indicating the upper limit of the printable page number set in the image forming apparatus depending upon the contents of the contract, and the total printed page number information indicating the total number of pages that has been printed by the image forming apparatus 1. Furthermore, the controller 80 may execute a print process for printing one or more sheets in accordance with the print job, an increment process for incrementing the total printed page number information by one each time when one side printing for one sheet is performed, and by two each time when double-sided printing for one sheet is performed in the print process, and a second print availability determining process for determining, after execution of the increment process, whether the printed sheet number indicated by the total printed page number information is greater than or equal to the upper limit sheet number indicated by the first upper limit information. In a further modification, the controller 80 may execute a print inhibition process for inhibiting printing in the subsequent print process in the case where the second print availability determining process indicates that the total printed page number indicated by the total printed page number information is greater than or equal to the first upper limit sheet number indicated by the first upper limit information.

Next, flows of processes executed by the controller 80 of the image forming apparatus according to one example of the modification will be described while referring to FIGS. 7 and 8. In the following description, the same steps as those described in the above-mentioned embodiments is assigned the same reference numeral and the description may be omitted.

<Print Associated Process>

Figure 7:
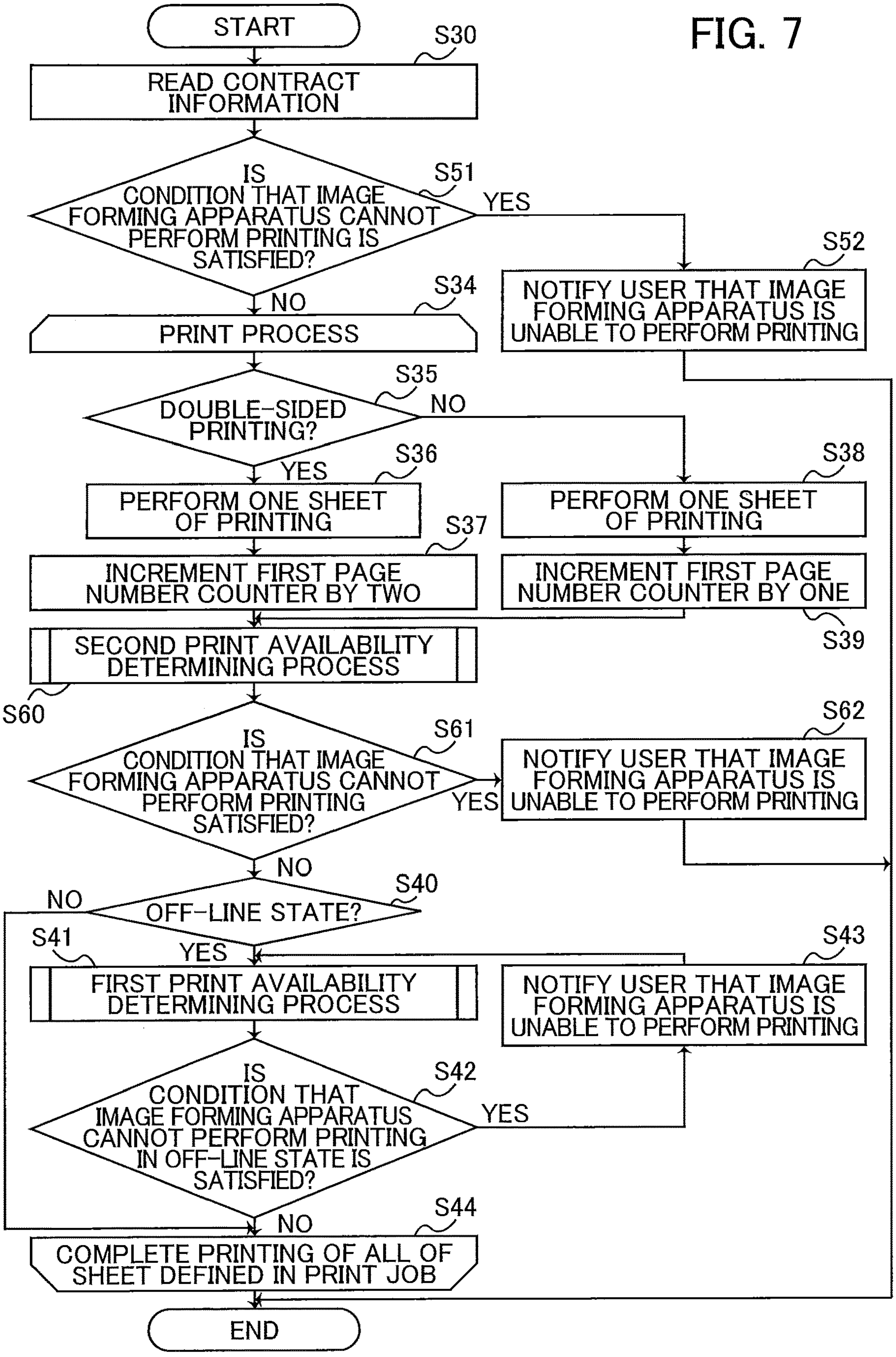
FIG. 7 is a flow chart illustrating a flow of a print associated process according to a modification.

FIG. 7 is a flowchart illustrating a flow of a print associated process according to one example of the modification. A series of processes shown in the flowchart of FIG. 7 starts with receipt of the print job by the image forming apparatus 1 operating as a trigger.

When the print job is received, the controller 80 reads the contract information stored in the main body memory 82 (S30), whereupon the controller 80 determines whether a condition that the image forming apparatus 1 cannot perform printing is satisfied (S51). More specifically, the controller 80 determines whether the printed page number has reached the first upper limit number that is printable within the term specified in the contract of the image forming apparatus 1, or the printed page number has reached the second upper limit number that is the printable page number when the image forming apparatus 1 is in the-off-line state. When the controller 80 determines that the printing cannot be performed with the image forming apparatus 1 (S51: YES), that is, when the printed page number has reached the first upper limit number or the second upper limit number, the controller notifies the user that the image forming apparatus 1 is unable to perform printing (S52). For example, the controller 80 displays a message on the display section of the image forming apparatus 1 notifying that the printing cannot be performed.

On the other hand, when the controller 80 does not determine that the image forming apparatus 1 is incapable of printing (S51: NO), that is, when the printed page number has not yet reached the first upper limit number and the second upper limit number, the controller 80 performs the print process defined in the print job (S34). Since the contents of the steps S35 to S39 are the same as those of the steps S35-S39 in the above-described embodiments, description of S35-S39 are omitted.

After performing the step S37 or S39 (increment process), the controller 80 executes the second print availability determining process (S60). The second print availability determining process indicates a determining process for determining whether print can be performed or not. Detail of the second print availability process will be described later.

As a result of the second printability determination process of S60, when the controller 80 determines that printing cannot be performed (S61: YES), the controller 80 notifies the user of the print incapability through the display section or the like (S62). After the step S62, the controller ends the process. On the other hand, when the controller 80 determines that printing can be performed as a result of the second print availability determination (S61: NO), the controller executes steps S40 to S44. Since the contents of the steps S40 to S44 are the same as those of the steps S40-S44 in the above-described embodiments, description will be omitted.

<Second Print Availability Process>

Figure 8:
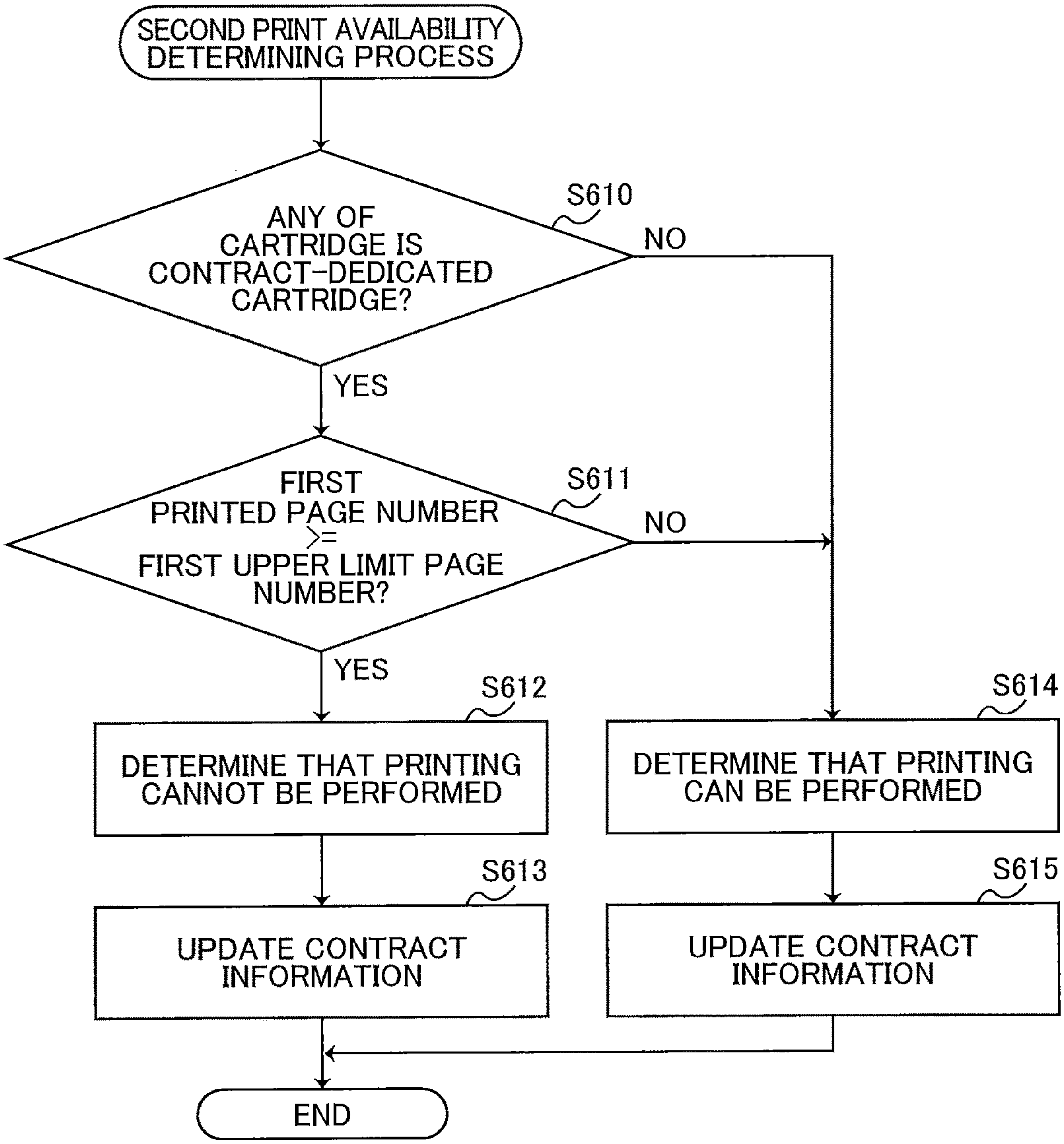
FIG. 8 is a flowchart illustrating a flow of a second print availability determining process according to the modification.

FIG. 8 is a flowchart illustrating a flow of the second print availability determining process of S80. When the second print availability determining process starts, First, the controller 80 reads the ink type information stored in the main body memory 82 so that the image forming apparatus 1 can recognize whether any of the ink cartridges 4 attached to the image forming apparatus 1 is the contract-dedicated cartridge (S610).

When the controller 80 recognizes that at least one of the cartridges is the contract-dedicated cartridge (S610: YES), the controller 80 determines whether the first printed page number that is obtained through incrementing in S37 or S39 in FIG. 7 is greater than or equal to the first upper limit page number (S611). When the controller 80 determines that the first printed page number is greater than or equal to the first upper limit page number (S611: YES), the controller 80 determines that printing to be executed in S611 et seq cannot be performed (S612). Then, the controller 80 updates the contract information stored in the main body memory 82 to the context that the contract is being effective and printing is being stopped (S613: print inhabitation process). In other words, the controller 80 inhibits execution of printing in step S611 et seq.

On the other hand, when the controller 80 determines that the first printed page number is smaller than the first upper limit page number (S611: NO), the controller 80 determines that printing can be performed (S614), and updates the contract information stored in the main body memory 82 to "normal" (S615). In other words, the controller 80 approves printing to be executed in S611 et seq.

When the controller 80 does not determine that at least one ink cartridge is the contract dedicated cartridge (S610: NO), that is, when all cartridges are the normal type cartridges, the controller 80 determines that printing can be performed (S614), and updates the contract information in the main body memory 82 to "normal".

Software Implemented Example

The control blocks of the image forming apparatus 1 and the server 9 may be implemented by logic circuits (hardware) formed on an integrated circuit (IC chip) or by way of a software solution.

In the latter case, each of the image forming apparatus 1 and the server 9 includes a computer for executing program commands that are software for implementing each function. Each computer in the image forming apparatus 1 and the server 9 includes, for example, one or more processors and a storage medium readable by the computer storing the programs. In such a computer, the object of the present disclosure can be achieved by reading the programs from the storage medium and executing the same by the processor. As such a processor, a CPU (Central Processing Unit) can be used, for example. As the storage medium, a "tangible medium not provided with a temporarily data storing capability" can, for example, be employ, such as ROM (Read Only Memory), a tape, a disk, a card, a semiconductor memory, or a programmable logic circuit. In addition, a RAM (Random Access Memory) for developing the programs may further by provided. The programs may be supplied to the computer through an arbitrarily selected program transferable transfer medium (communication network or broadcasting waves). In one example of the present disclosure, the supply of the programs may be implemented in the form of a data signal in which the programs are embedded in a carrier wave realized by an electronic transmission.

The present disclosure is not limited to the above-described embodiments, and various modifications can be made within the scope of the claimed coverage. It should be noted that further embodiments that can be attained by combining technical measures disclosed in different embodiments are also within the technical scope of the present disclosure.

What is claimed is:

1. A method comprising:

allowing, by a printer, printing one or more sheet according to a print job within an upper limit of a printable page number that the printer is allowed to print in an off-line state in which the printer is not connected to a network, and allowing, by the printer, printing a double-sided printing when there is one printable page remaining up to the upper limit, in a case where a printed page number printed by the printer in the off-line state is greater than or equal to the upper limit.

2. The method according to claim 1, further comprising:

inhibiting printing in the off-line state after printing the double-sided printing.

3. The method according to claim 1, further comprising:

resetting the printed page number to zero in a case where the printer shifts from the off-line state to an on-line state in which the printer is connected to the network.

4. The method according to claim 1, further comprising:

incrementing the printed page number by one in a case where the printer prints a one side printing, and incrementing the printed page number by two in a case where the printer prints the double-sided printing.

5. A method comprising:

allowing, by a printer, printing one or more sheet according to a print job within an upper limit of a printable page number that is defined in accordance with contents of a contract set in the printer, and allowing, by the printer, printing a double-sided printing when there is one printable page remaining up to the upper limit, in a case where a printed page number printed by the printer in the contract set is greater than or equal to the upper limit.

6. The method according to claim 5, further comprising:

inhibiting printing in the contract set after printing the double-sided printing.

7. The method according to claim 5, further comprising:

incrementing the printed page number by one in a case where the printer prints a one side printing, and incrementing the printed page number by two in a case where the printer prints the double-sided printing.

* * * * *